R. W. JORDAN.
WHEEL RIM.
APPLICATION FILED MAY 6, 1916.
1,217,458.
Patented Feb. 27, 1917.
2 SHEETS—SHEET 1.
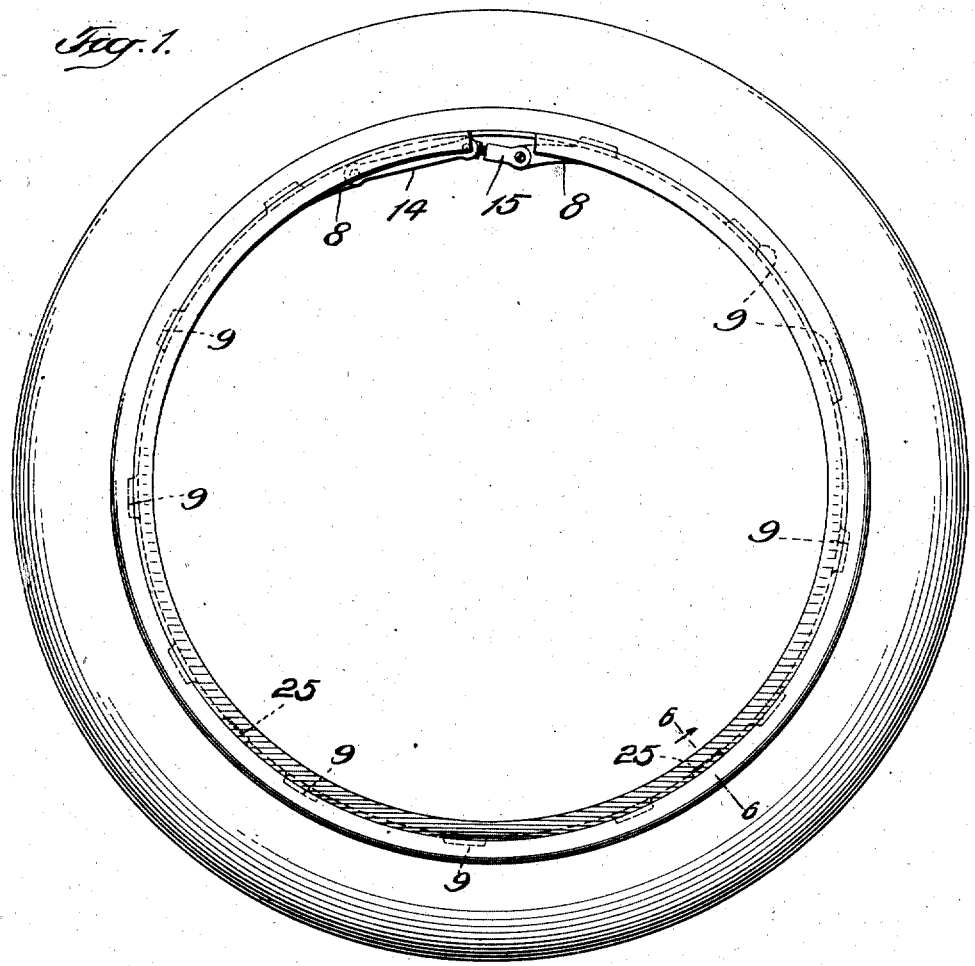
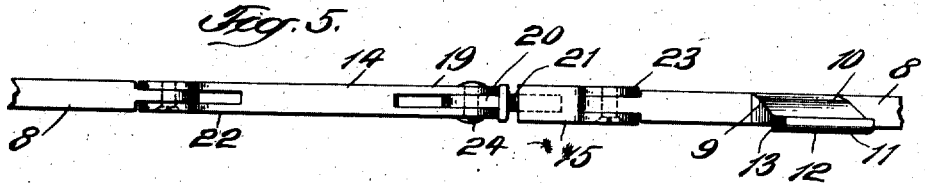
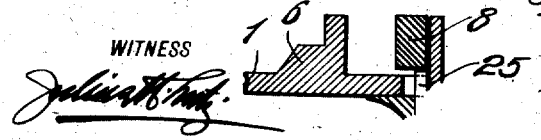
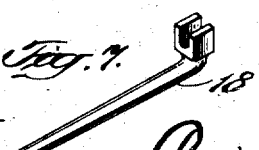
WITNESS
INVENTOR
ATTORNEY R. W. JORDAN.
WHEEL RIM.
APPLICATION FILED MAY 6, 1916.
1,217,458.
Patented Feb. 27, 1917.
2 SHEETS—SHEET 2.
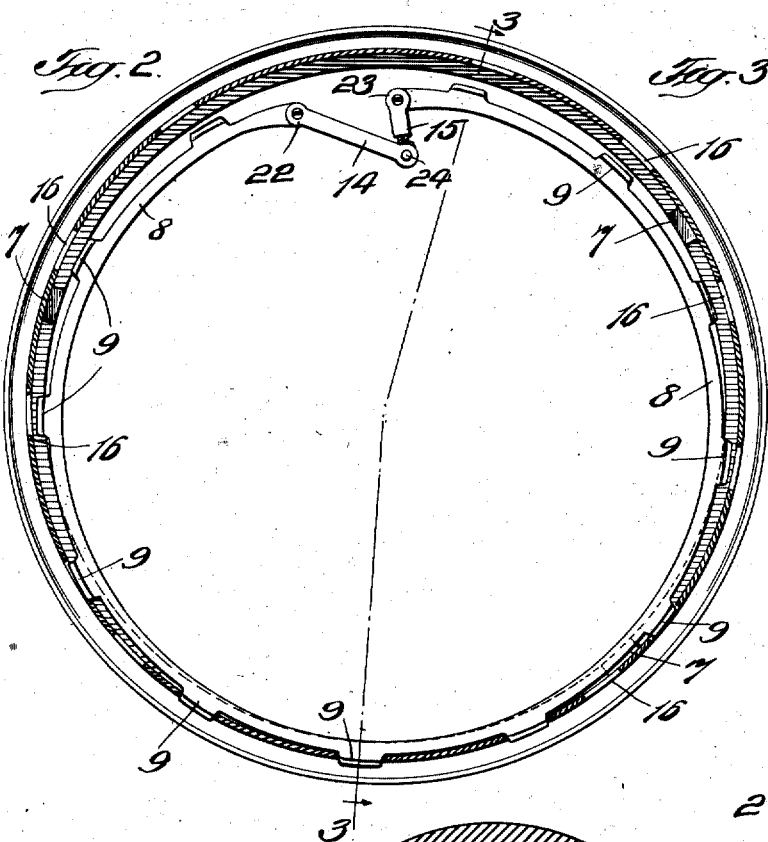
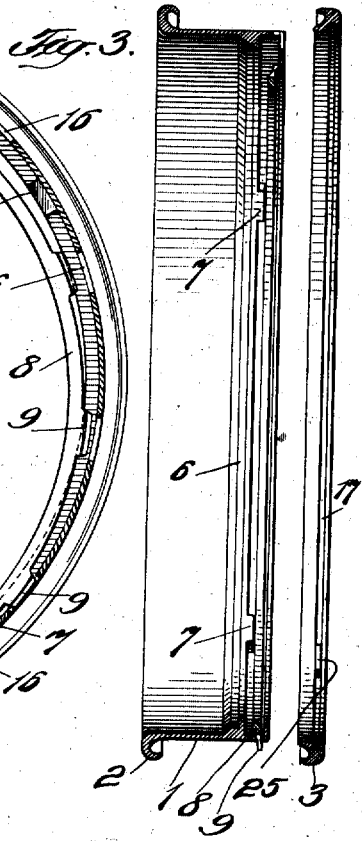
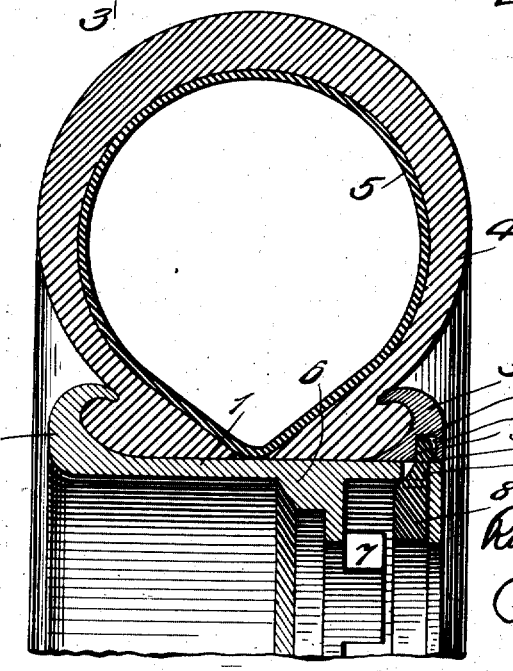
WITNESS
INVENTOR
Rurie W. Jordan,
BY
Fred C. Fisker
ATTORNEY.

UNITED STATES PATENT OFFICE.

RURIC W. JORDAN, OF HOLDERNESS, NEW HAMPSHIRE, ASSIGNOR TO JORDAN DEMOUNTABLE RIM COMPANY, OF BOSTON, MASSACHUSETTS, A CORPORATION OF MASSACHUSETTS.

WHEEL-RIM.

1,217,458.

Specification of Letters Patent. Patented Feb. 27, 1917.

Application filed May 6, 1916. Serial No. 95,755.

*To all whom it may concern:*

Be it known that I, RURIC W. JORDAN, a citizen of the United States, residing at Holderness, in the county of Grafton and State of New Hampshire, have invented certain new and useful Improvements in Wheel-Rims, of which the following is a specification, reference being had therein to the accompanying drawing.

This invention relates to a detachable rim for a wheel, particularly a wheel of the kind used with automobiles and other vehicles. The object of the invention is to enable a portion of the rim to be quickly and easily removed from the wheel, and to be reapplied with equal ease, accuracy, and swiftness. The invention consists essentially in a detachable ring and in means for locking it in place, said means consisting of an expansible ring so related to the removable ring that when the tire is in position and is inflated, the pressure of the air will laterally adjust the detachable ring and so lock it that it cannot be removed from the wheel until the tire is again deflated; and the invention comprises numerous details and peculiarities in the construction, arrangement and combination of the various parts, substantially as will be hereinafter described and more particularly pointed out in the claims.

In the accompanying drawing illustrating my invention:

Figure 1 is a side elevation of a wheel rim with my present invention applied thereto;

Fig. 2 is a longitudinal section;

Fig. 3 is a cross-section on the line 3, 3 of Fig. 2 with the quick detachable ring removed from the remainder of the rim;

Fig. 4 is an enlarged transverse section of the wheel rim at a certain point in the circumference and shows the relative arrangement of the removable ring, the locking ring, and the tire with its inner tube arranged between the clencher flanges;

Fig. 5 is an edge view of a part of the expansible locking ring and its toggle links;

Fig. 6 is a partial cross-section of the removable ring in its relation to the other parts on line 6, 6 of Fig. 1;

Fig. 7 is a detail perspective view of the wrench or tool which is used for expanding or contracting the locking ring and thus applying and removing it.

Similar characters of reference designate corresponding parts throughout the different figures of the drawing.

1 denotes the rim of the wheel which is designed to be permanently attached to any kind of a felly, not shown, said rim having at one of its peripheral edges an integral clencher flange 2 while at the other edge is a removable or quick detachable ring 3 similar to the flange 2, except that it is made as a separate ring instead of being integral with the rim 1. Between the members 2 and 3 the beaded walls of the shoe 4 are inserted, within which shoe is the usual inflatable inner tube 5.

The rim 1 is provided interiorly with a suitable rib or flange 6 having projections 7 at certain points against which the locking ring 8 comes into contact when it is in position. This ring 8 is similar to the ring used for a like purpose in my former Letters Patent for tire fastener granted July 5, 1910, No. 963,048. Said ring is a flexible ring having on its periphery a series of teeth 9 which are preferably slightly beveled on one side, as indicated at 10 in Fig. 5, and which are formed at their outer ends with offset edges 11, the outside of which is slightly beveled as shown at 12 while the lower portion of said offset edge 11 forms a shoulder or rabbeted flange 13 which is itself slightly beveled, as clearly indicated at 14 in Fig. 4. The shoulder 13 is contiguous to the main body proper of the ring 8 as is shown in the detailed construction in Fig. 5, so that the offset outer ends 11 are thus at one side of the main body of the ring 8. The ring 8 is discontinuous, that is to say, it is severed at one point and the severed ends are connected by a pair of links 14 and 15 by means of which the ring can be expanded and contracted.

The rim 1 near one edge is provided with a circumferential series of slots 16 adapted to receive the projections 9 on the flexible ring 8. The removable ring 3 is internally circumferentially grooved at 17, and when the said ring 3 is in position on the rim 1, said groove 17 will coincide with slots 16 to a greater or less extent so that the projections 9 on the ring 8 may project through the slots 16 and engage the groove 17 in the ring 3, all as clearly shown in the views indicated in Figs. 3 and 4. The ring 3 is placed around and upon the rim 1 in the manner just described, and then the expan sible flexible ring 8 is placed in the position shown in Fig. 2 where some of its projections 9 engage their respective slots 16 while the remainder of said projections are opposite to other slots 16 and calculated to be thrust into the same when the ring 8 is expanded. The positioning of the ring 8 is easily made by placing said ring in contact with the projections 7 inside of the rim 1, for the projections 9 will then be in such relation to the slots 16 that they can be forced toward and into said slots. The links 14 and 15 form a toggle and when straightened out they expand the ring 8 so as to bring these teeth 9 into the slots 16 and also into the interior groove 17 in the ring 3. The movement of the links 14 and 15 is accomplished by means of a lever or other implement 18 shown in detail in Fig. 7. When the links 14 and 15 are swung away from each other, the ring 8 contracts and withdraws the teeth 9 from the slots and thus releases the ring 3, as also the flexible ring 8, and allows the several parts to be quickly disassembled.

The construction of the links is clearly indicated in Figs. 5 and 6. One of the links, as 14, is forked at 19, and in said fork is pivoted the end 20 of a screw 21 which screws adjustably into the adjoining end of the other link 15, said screw 21 thus making the relation between the links 14 and 15 an adjustable one. These links 14 and 15 at their opposite ends are also forked as shown at 22 and 23 to enable them to be pivotally attached to the ends of the flexible ring 8 (see Fig. 5). The parts are all so arranged that when the links 14 and 15 are expanded to expand the ring 8, the teeth 9 may pass through the slots 16 and enter the groove 17 to hold the parts together. When the links are in their expanded position, the pivotal point of these two links, which is at 24 (see Fig. 5) will be so located with respect to a straight line between the points at which the links are connected to the ends of the ring 8, that any pressure on the links will be in a direction opposite to that tending to contract the links, by reason of which the ring will not get loose accidentally. When in an expanded position the links rest against the inner wall of the rim 1, and it is also true that in the expansion of the links the central pivotal point will pass the straight line between the points at the ends of the ring 8 and thus cannot possibly be brought back so as to collapse the ring 8 without the action of the tool or wrench 18.

When the parts are being assembled, it will be understood as I have already explained that the teeth that pass through the slots 16 will engage the groove 17 in the ring 3. Next, the inner tube 5 will be inflated in the usual way and when the pressure reaches the proper point, it will be obvious that the shoe 4 will press outwardly upon the detachable ring 3, the effect of which will be to slide the ring 3 laterally so that it will pass partly over the slots 16 and allow a portion thereof to rest on the rim 1 outside of the slots 16 as shown in Fig. 4. The ring 3 has a couple or more lugs 24 that enter holes in rim 1 and keep the rim from becoming displaced (see Fig. 6). The lateral movement of the ring 3 carries with it the ring 8 and its teeth 9, the shoulders 13 of which rest upon and tightly engage the rim 1, and this clutching engagement of the parts will be maintained so long as the tube 5 is inflated, but the moment it is deflated it will be possible to move the quick detachable ring 3 inwardly and disengage the teeth 9 therefrom by collapsing the flexible ring 8, hence all danger of any accident will be avoided, for it will be impossible to remove the ring 3 on account of the engagement of shoulders 13 with rim 1 so long as the air pressure acts against the member 3 to hold it outwardly, but when the air pressure is taken away from the inner tube and consequently from the ring 3, it will then not be dangerous to remove the ring 3, and it can be easily done in the way I have just explained.

Many changes in the precise arrangement of the various parts may be made without exceeding the scope of my invention, and I therefore reserve the liberty of modifying and rearranging the different parts in order to attain the best results.

Having thus described my invention, what I claim as new and desire to secure by Letters Patent, is:

1. In a wheel rim, the combination with a flanged and slotted rim, of a detachable ring; and an expansible ring on the inside of the rim and having offset teeth entering the slots therein and engaging the detachable ring.

2. In a wheel rim, the combination with a rim proper having an integral lateral flange, and having also a circumferential series of slots, of a detachable ring adapted to be placed upon the rim contiguous to the said slots and opposite to the flange of said rim, said ring having an inner groove, and an expansible ring having a series of teeth with offset ends, said teeth passing through the slots and engaging the groove in the ring and adapted to have their offset ends engage the rim contiguous to the slots when the air pressure shifts the ring laterally.

3. In a wheel rim, the combination with a rim proper having an integral lateral flange, and having also a circumferential series of slots, of a detachable ring adapted to be placed upon the rim contiguous to the said slots and opposite to the flange of said rim, said ring having an inner groove, and an expansible ring on the inside of the rim, said ring having a series of teeth having offset ends whose outer portions are inclined and form with shoulders adapted to engage the body of the rim, said teeth passing through the slots and engaging the groove in the ring and having the shoulders engaging the rim to prevent removal of the detachable ring while the tire is inflated.

4. In a wheel rim, the combination with a rim proper having an integral lateral flange, and having also a circumferential series of slots, of a detachable ring adapted to be placed upon the rim contiguous to the said slots and opposite to the flange of said rim, said ring having an inner groove, and an expansible ring whose ends are connected by toggles, said ring being provided with teeth having inclined sides and offset ends, which ends are shouldered, said teeth being adapted to pass through the slots in the rim and engage the groove in the ring and hold the latter in position on the rim.

5. The combination with a wheel, of a flanged rim thereon, said rim being provided with a circumferential series of apertures, and a removable ring shaped to correspond to the flange opposite thereto on the rim and having an inner circumferential groove, and an expansible ring within the rim having teeth passing through the apertures in the rim and engaging the groove in the detachable ring, said teeth being offset, and all arranged so that when the air pressure in the tire is applied to the parts, the detachable ring will be laterally shifted to cause the expansible ring to be likewise slightly shifted so that it may lock the ring against removal.

6. The combination with a wheel, of a rim having an integral flange and a circumferential series of apertures, a detachable ring lying opposite to said flange and loosely surrounding the rim, said flange having lugs engaging the rim so as to prevent creeping or displacement, means within the rim and carried thereby for positioning a contiguous member, and the contiguous member consisting of an expansible locking ring whose ends are connected by toggles, said ring having a series of offset teeth passing through the apertures and engaging the detachable ring, the outer portions of said teeth having inclined sides.

In testimony whereof I affix my signature.

RURIC W. JORDAN.

Copies of this patent may be obtained for five cents each, by addressing the "Commissioner of Patents, Washington, D. C."